United States Patent [19]
Leturmy et al.

[11] Patent Number: 6,074,203
[45] Date of Patent: Jun. 13, 2000

[54] METHOD FOR SUPPLYING GAS TO A CHAMBER AND METHOD FOR REGULATING THE CONTENT OF A GIVEN ELEMENT IN THE ATMOSPHERE OF SUCH A CHAMBER

[75] Inventors: Marc Leturmy, La Queue les Yvelines; Frédéric Pioger, Chaville, both of France

[73] Assignee: L'Air Liquide, Societe Anonyme pour l'Etude et l'Exploitation des Procedes Georges Claude, Paris, France

[21] Appl. No.: 09/125,529

[22] PCT Filed: Dec. 17, 1997

[86] PCT No.: PCT/FR97/02330

§ 371 Date: Aug. 20, 1998

§ 102(e) Date: Aug. 20, 1998

[87] PCT Pub. No.: WO98/28102

PCT Pub. Date: Jul. 2, 1998

[30] Foreign Application Priority Data

Dec. 20, 1996 [FR] France .................... 96 15785

[51] Int. Cl.[7] ..................................... F27B 9/40
[52] U.S. Cl. .................. 432/47; 432/37; 432/38
[58] Field of Search .................. 432/37, 38, 47

[56] References Cited

U.S. PATENT DOCUMENTS

| | | | |
|---|---|---|---|
| 4,490,108 | 12/1984 | Petzi | 432/37 |
| 4,975,047 | 12/1990 | Mitsuhashi et al. | 432/37 |
| 5,296,680 | 3/1994 | Yamada . | |
| 5,440,101 | 8/1995 | Cox et al. . | |
| 5,795,147 | 8/1998 | Saxena et al. | 432/47 |

FOREIGN PATENT DOCUMENTS

96/04095  2/1996  WIPO .

OTHER PUBLICATIONS

Patent Abstracts of Japan, vol. 095, No. 003, Apr. 28, 1995 and JP 06 344176.

*Primary Examiner*—Denise L. Ferensic
*Assistant Examiner*—Gregory A. Wilson
*Attorney, Agent, or Firm*—Burns, Doane, Swecker & Mathis, L.L.P.

[57] ABSTRACT

The invention relates to a process for supplying gas to a chamber which is supplied via a supply network which includes at least one primary line connected in its upstream part to a supply of the said gas, and at least two respective secondary lines connected to the primary lines, being characterized in that the content of a given component of the atmosphere in the chamber is measured at least at one point in the chamber, the measured content is compared with at least one predetermined control value for the content of the said component of the atmosphere in the chamber at the said point and, where necessary, the pressure of the gas at one of the points in the network is varied, depending on the result of this comparison.

23 Claims, 3 Drawing Sheets

METHOD FOR SUPPLYING GAS TO A CHAMBER AND METHOD FOR REGULATING THE CONTENT OF A GIVEN ELEMENT IN THE ATMOSPHERE OF SUCH A CHAMBER

BACKGROUND OF THE INVENTION

1. Field of the Invention

The present invention relates to the field of tunnels or chambers supplied with gas in order to carry out operations under an atmosphere, such as, for example, heat-treatment operations, soldering operations, operations of packaging food products or cooling operations using cold gases.

The present invention relates to:
- a method of regulating the content of a given component of the atmosphere in a chamber;
- a process for supplying gas to a chamber, implementing this regulating method; and
- the application of this method and of this process to the cases of heat-treatment ovens or soldering ovens, or else of ovens or machines for soldering/tinning electronic components, or alternatively of chambers for the packaging or cooling of food products.

By way of illustration, such "tunnels" or "chambers" might thus, for example, consist of heat-treatment ovens, soldering ovens, ovens for the reflow soldering of electronic components on circuits, or else machines for the wave soldering/tinning of electronic components, whether these machines are designed as tunnels which are completely sealed over their entire length or they are provided with shrouding systems extending above the solder bath or to a greater or lesser extent largely around this solder bath in order to enclose, for example, the preheat zone.

2. Description of Related Art

Two problem areas encountered by users of such plants are:

1) The Instability of the Atmosphere Employed:

Mention may be made here of the widespread example of applications in which the user tries to stabilize the residual oxygen content of the nitrogen-based atmospheres employed in these chambers.

This problem area of stabilizing the atmosphere employed is, of course, closely linked with the user's desire for excellent reproducibility of the quality of the components or products treated in the chamber in question.

Still by way of illustration, variations in the quality of the components treated in the chamber may, for example, be related, in the case of inert-type atmospheres, to the oxidizability of the atmosphere (therefore to the level of residual oxygen or other oxidizing gas in this atmosphere), or else to instabilities in the heat transfer employed in the chamber due to the observed instabilities in the atmosphere employed, whether this be instability in terms of composition or in terms of gas flow rates.

The observed instabilities in the atmosphere are more generally related to the production rate of the chamber or to the external conditions surrounding the oven, for example possible droughts.

In this first problem area, mention may be made of the case of ovens for the reflow soldering of electronic components on circuits, so-called "convective" ovens, which therefore carry out the heat transfer necessary for soldering the component in an essentially convective mode, circulating very large volumes of gas in each zone of the oven.

It is known in fact that at least some of the zones of such convective ovens (in particular the hot zones) operate with a gas recirculating (recycling) system. In these recirculating zones, only a "relatively low" volume is regularly added, in order to compensate for the gas losses involved, in particular via the extraction chimneys or the inlets/outlets of the oven.

These convection reflow ovens are therefore characterized, on the one hand, by very large consumptions of gas but also, on the other hand, by great difficulties encountered by users in regulating these ovens, any modification of the gas flow in certain zones of the oven having considerable repercussions on the distribution equilibrium of the gas movements in the oven (turbulence) and on the existing heat profile (and therefore necessarily on the quality of the components produced).

Studies carried out by the Applicant on this subject show, in fact, that these ovens must be adjusted in the production phase in order to perform correctly and be representative of the subsequent operating conditions. It is then necessary to modify the flow rate selectively supplying such or such a zone of the oven manually, thereby giving rise to considerable variations in the flow rate in the other zones of the oven which require manual readjustments to be made zone by zone.

In order to illustrate these considerations, let us thus take the example of the adjustment of such a convective oven, supplied overall with a flow rate of 50 $Nm^3/h$ of nitrogen, this adjustment being carried out, for example, in a very precise and stable manner using a mass flow rate regulator present on the upstream side of the plant (upstream of the set of lines serving all the zones of the oven). Should it be necessary, in the adjustment phase, to drop the flow rate in one of the zones, for example from 20 $Nm^3/h$ to 5 $Nm^3/h$, the regulator will continue to supply the oven with an overall flow rate of 50 $Nm^3/h$, and therefore distributing the 15 $Nm^3/h$ excess over all the other lines. It is therefore found that the flow rate in the other zones will be irremediably modified, thus also modifying the heat transfer which occurs therein, and therefore the overall quality of the components produced (it will be recalled that the oven is necessarily adjusted during production, i.e. "live").

2) Savings in Gas:

Some of the plants mentioned therefore consume a very large amount of gas, and it is therefore a constant preoccupation of users to try to decrease the flow rates employed in the chamber, i.e. to find the best compromise between the gas flow rate used and the quality of the components produced.

Among the approaches generally adopted for making such savings in gas consumption are decreasing the gas flow rates used depending on the production rate of the components (for example, to manage the production breaks), or optimizing the composition of the atmosphere used, for example the residual oxygen content tolerated in the atmosphere in the chamber depending on the characteristics of the components treated in this chamber (for example, the level of oxidizability of the metals treated).

Considering the example of nitrogen-based atmospheres, having a controlled oxygen content, one of the existing approaches for solving these problems may be termed the "flow-rate-regulation atmosphere control" approach.

According to this approach, a certain adjustment (flow rate and distribution of the gas injections into the chamber) and a chosen supply of nitrogen, of a given oxygen purity, are employed, these being sufficiently limited for there effectively to exist variations or perturbations in the operation of the chamber which can cause the maximum permissible residual oxygen content of the atmosphere in this chamber to be exceeded.

The gas supply chosen is then used in combination with a regulating system making it possible, when the measured residual oxygen content of the atmosphere in the chamber exceeds a given threshold, because of the abovementioned variations or perturbations, to increase the overall flow rate of gas in the chamber so as to decrease this flow rate only when the measured oxygen content of the atmosphere in the chamber has gone back below the threshold.

To be sure, this approach makes it possible to adapt the purity of the gas supply used and the flow rate employed to the actual requirements of the practical operation in the chamber, but may lead, in the long run, to a relatively high overall gas consumption. As mentioned above, the applicant has furthermore observed, in practice, the fact that some plants, such as convective-reflow soldering ovens, are very difficult to adjust in terms of flow rate, and the variations in the flow rate employed in certain zones of the oven, such as conventionally in the key zone of the reflow peak in such soldering operations, lead to considerable variations in the other zones of the oven, and therefore overall to instability phenomena in the process itself:

the flow rate variations are, on the one hand, the source of turbulence, promoting the creation of air intakes into the chamber (modification of the equilibrium in the gas movements) and therefore degradation of the quality of the atmosphere in this chamber;

as described previously, a variation in the convective heat transfer carried out inside the chamber, and therefore in the quality of the soldered products obtained on leaving this chamber.

SUMMARY OF THE INVENTION

The present invention is intended to provide a process for supplying gas to a chamber, and a method of regulating the content of a given component of the atmosphere in this chamber, making it possible to remedy the various technical problems raised above.

The method of regulating the content of a given component of the atmosphere in a chamber according to the invention, the chamber being supplied by a supply network which includes at least one primary line connected in its upstream part to a gas supply, and at least two respective secondary lines (of the said primary line) connected in their upstream part to the primary line and emerging in their downstream part in the chamber, the primary lines coming from an upstream node which is itself supplied with gas via a feed pipe, is characterized by the implementation of the following steps:

a) the content of the given component of the atmosphere in the chamber is measured at at least one point in the chamber;

b) a comparison is made with at least one predetermined control value for the content of the said component of the atmosphere in the chamber at the said point; and c) where necessary, the pressure of the gas at one of the points in the network is varied, depending on the result of this comparison, preferably one of the following points:

i) on the primary line or one of the primary lines, upstream of the point of connection of the first respective secondary line to the relevant primary line;

j) on the primary line or one of the primary lines, between the two points of connection of two of the secondary lines to the relevant primary line; and k) on the feed pipe upstream of the upstream node.

As will be clearly apparent to those skilled in the art on reading the foregoing, the regulating method according to the invention therefore allows selective control, via the pressure, of the flow of gas supplying all or only part of the chamber, the pressure (and therefore the flow rate) variations caused in the relevant portion of the network then being strictly of no consequence to the rest of the network, and therefore to the rest of the chamber.

According to a first embodiment of the invention, step c) of varying the pressure at the chosen point in the network is carried out in the following manner:

c1) a solenoid valve with proportional control is placed at the relevant point in the network;

c2) the pressure of the gas near this point is measured downstream of the solenoid valve;

c3) the measurement of the content of the given component, obtained during step a), is transmitted to a data acquisition and processing unit capable, depending on the said content measurement and on the comparison made during step b), of generating a pressure control value Cp; and c4) this pressure control value Cp is transmitted to a means capable of comparing the pressure measurement of step c2) with the control value Cp and of accordingly modifying the amount by which the solenoid valve is open in order, where necessary, to bring the said pressure back to the level of the control value Cp.

It will be possible, for example, to employ such an embodiment using, as the data acquisition and processing unit, a system which is quite sophisticated (in the sense of artificial intelligence), typically a regulator, and as means of acting on the proportional solenoid valve, an electronic card, the "transfers" (for example, the transfer of a content measurement) and the "transmissions" of data and the feedback operations between the various means of the system according to the invention taking place by all means known to those skilled in the art, such as the transfer of 4–20 mA signals, the transfer of 0–10-V signals, the transfer of a computer logic signal, etc.

As will be clearly apparent to those skilled in the art, Acquisition unit and Means of acting on the solenoid valve may also be integrated into a single entity.

It may be imagined that the data acquisition and processing unit, which is capable of generating a pressure control value Cp, does so according to a predeveloped mathematical algorithm, which is adapted to the situation to be managed, depending in particular on the type of chamber in question, on the type of operation carried out inside the chamber and on the type of production handled, but also on the composition of the atmosphere being manipulated.

Purely by way of illustration, such an algorithm may, depending on the case in question, be based on a PID, on threshold-type logic, or on another type of logic, such as fuzzy logic.

The new pressure control value, redefined by the unit, then makes it possible to re-establish the defined content of the component of the atmosphere in the chamber at the level of the desired content control value.

The electronic card, on receiving, on the one hand, the pressure measurement and, on the other hand, the pressure control value modified by the regulator, is capable, again using an algorithm which is appropriate to it (for example, of the PID type), of modifying the amount by which the solenoid valve is open in order to re-establish the required pressure level downstream of the solenoid valve.

This first embodiment may therefore be called the mode in which the operation of the chamber is "pressure regulated" because of the fact that the content of the relevant component is regulated by acting on the supply pressure for the oven.

According to another embodiment of the invention, step c) of varying the pressure at the relevant point in the network is carried out in the following manner:

c1) that line of the network where the relevant point lies, whether it be a primary line or a feed pipe, is subdivided at the relevant point in the network where the pressure is made to vary, into at least three bypass lines, each of these bypass lines being equipped with a solenoid valve and with a pressure-reducing valve lying downstream of the solenoid valve, the downstream end of each of the bypass lines being connected again to the relevant line of the network;

c2) each of the three pressure-reducing valves is preset to a predetermined pressure level; and c3) the measurement of the content of the given component, obtained during step a), is transmitted to a data acquisition and processing unit capable, depending on the measured content and on the comparison made during step b), of selectively opening one of the solenoid valves in order to allow passage of the gas only into the bypass line whose solenoid valve has been opened.

The "predetermined" pressure level in each line is preferably determined experimentally under the actual operating conditions.

The data acquisition and processing unit may in this case also consist of a system of greater or lesser sophistication, whether this be, for example, a programmable controller, a system of multithreshold relays (tripping dry contacts) or a computer of the PC type.

The comment made earlier with regard to "transfers" or "transmissions" of data or other feedback operations according to the invention also applies to this second embodiment of the invention.

It may be imagined, on reading the above, that the latter embodiment makes it possible very advantageously to vary the gas supply pressure, over all or part of the network, according to three predefined discrete levels. This embodiment of the invention may therefore be called "multithreshold-level regulating" (i.e. regulating the content of the component in question by acting on the supply pressure for the oven according to predetermined thresholds).

According to this embodiment, it may be a matter of indifference as to whether the solenoid valves are in the "normally open" or "normally closed" position, the unit adapting to the configuration chosen for operating (therefore turning on) the line chosen. Thus, by way of illustration, in the case of "normally closed" valves, the signals sent by the unit will open the solenoid valve of the line which is desired at this precise moment to be turned on, and will allow the channel which was previously in use to close, the solenoid valve of the third line, of course, being not in operation since it is "normally closed".

By way of illustration, it will be possible to employ the following pressure levels:

in a first bypass line, a pressure-reducing valve preset to a first pressure level $P_s$ corresponding to a gas supply flow rate, downstream of the pressure-reducing valve, which may be called the "standby" flow rate $Q_s$;

in a second bypass line, a pressure-reducing valve preset to a pressure level $P_{prod}$ corresponding to a gas flow rate, downstream of the pressure-reducing valve, which may be called the "production" flow rate $Q_{prod}$; and in the third bypass line, a pressure-reducing valve preset to a pressure $P_{fill}$ corresponding to a gas supply flow rate, downstream of the pressure-reducing valve, which may be called the "filling" flow rate (or the "turbo" flow rate) $Q_{fill}$.

The respective position of the three flow rates being [sic] as follows: $Q_s < Q_{prod} < Q_{fill}$.

Such a regulating method may then be used by supplying the chamber, for example, in the following manner:

when starting up the chamber (whether this be, for example, a heat-treatment oven or an oven or machine for the soldering/tinning of electronic components), a first, filling phase is carried out during which the chamber is supplied with gas, the "filling" bypass line being in operation (the other bypass lines therefore being closed).

This first phase of filling the chamber is maintained for a predefined time $t_{fill}$, which may, for example, vary from a few minutes to a few tens of minutes depending on the application in question.

It may be imagined that during this first, filling phase it will be preferable to prevent any product to be treated from entering the chamber, the chamber not yet being ready for carrying out the operation in question (depending on pre-established criteria).

Likewise, during this first, filling phase, it will be preferable in many cases to avoid taking measurements of the content of the desired component in question of the atmosphere in the chamber, the atmosphere still being in the filling phase, and it will therefore be preferred to leave the analyser (necessary for carrying out the measurement) on purge (for example, on a nitrogen purge). These precautions for protecting the analyser will, as may be imagined, depend significantly on the analyser technology used;

after the predefined filling time $t_{fill}$ has elapsed, the system is then ready to allow entry of the products to be treated and to start measuring the content of the relevant component of the atmosphere in the chamber.

This then corresponds to a second phase, which may be called the "standby" phase, in which the data acquisition and processing unit closes the solenoid valve of the "filling" bypass line in order to open the solenoid valve of the "standby" bypass line whose pressure-reducing valve is preset to a pressure level corresponding to the supply flow rate which was predefined as being a standby flow rate $Q_s$;

as soon as a component or product to be treated is detected (for example by a detection cell) at the entrance of the chamber (i.e. at a greater or lesser distance upstream on the conveyor for taking the components to the entrance of the chamber), the system is then in a phase which may be called the "production" phase in which the data acquisition and processing unit switches the system, this time, to the "production" bypass line, opening the solenoid valve corresponding to the third bypass line.

Advantageously, during this production phase, a delay time $t_{prod}$, for example of a few minutes, may be defined, after which, if a component to be treated has not again been detected at the entrance of the chamber, the data acquisition and processing unit will switch the system to the "standby" mode (it should be noted that this time $t_{prod}$ may in some cases be much longer than a few minutes since it is necessary to take into account the residence time in the chamber of the product previously allowed into this chamber);

after the production flow-rate conditions have been established, a measurement of the content of the relevant component of the atmosphere in the chamber may advantageously be taken, in order to allow entry of the products (which, it will be recalled, are detected at a greater or lesser distance upstream of the chamber), only if the measured content is below a threshold $S_{prod}$;

advantageously, if at any moment during the "production" phase the measurement of the content of the relevant component of the atmosphere in the chamber reaching the data acquisition and processing unit is above a first predefined threshold S1 (S1 is preferably greater than or equal to $S_{prod}$), the unit will switch the system to the "filling" bypass line and will wait until the measured content comes back below a second predetermined threshold (S2), equal to or less than the threshold S1, in respect of the content of the component of the atmosphere in the chamber, allowing the system to be returned to the "production" mode.

The pressure-variation embodiment which has just been described is a preferred embodiment, using a system of three (for example, filling/standby/production) bypass lines. It may be imagined that it would also be possible, without departing from the scope of the present invention, to use a system having two (for example, standby/production) preset channels, this system having, to be sure, an overall lower performance but being one which could be adopted by a user for reasons of simplicity or of cost.

Likewise, it may be imagined that it would also be possible to use one or more additional bypass lines compared to the three-line system described above, with predefined and preset pressure levels in each of these additional lines, for example in order to create a flow rate level above the filling level mentioned previously and employed should the content of the relevant component of the atmosphere in the chamber exceed a relatively high predefined level, therefore justifying the purging of the chamber with a high flow rate but also, for example, the taking of safety measures, such as audible or visual alarms and/or the prevention of components to be treated from entering the chamber.

Still by way of example, a fourth bypass line could be used as a chamber-purging safety line, in the case of a configuration in which the three solenoid valves are in "normally closed" mode.

The invention also relates to a process for supplying a chamber with gas, employing the method of regulating the content of a given component of the atmosphere in this chamber, as described previously.

BRIEF DESCRIPTION OF THE DRAWINGS

Other characteristics and advantages of the resent invention will emerge from the following description of embodiments, given by way of illustration, but implying no limitation, with reference to the appended drawings in which.

DETAILED DESCRIPTION OF THE INVENTION

Figure 1:
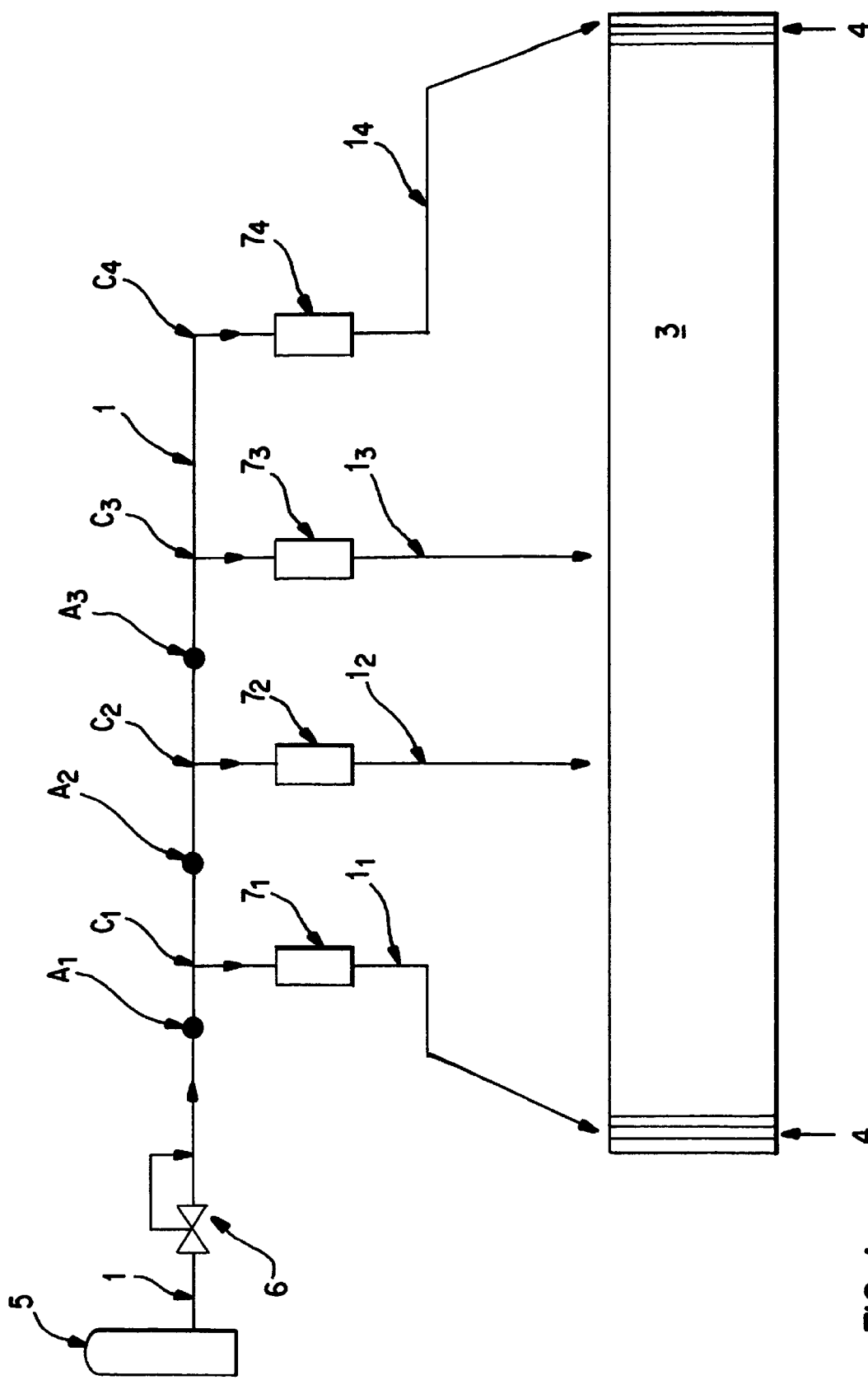
FIG. 1 is a diagrammatic representation of a plant which includes a chamber supplied by a single primary line to which four respective secondary lines are connected, allowing four zones of the chamber to be supplied with gas.

FIG. 1 therefore illustrates the case of a continuous oven 3 which may, for example, be a continuous oven in which a heat-treatment operation or a soldering operation is carried out, for example an operation to solder electronic components to a circuit. In the latter case, a soldering oven may, for example, operate in a radiative mode ("infrared" oven) or in a "convective" mode.

In the case of the embodiment shown, the chamber 3 is supplied with gas in four zones: the two inlet and outlet barrier zones 4, and two injections into hot zones in the oven (or else into a hot zone and a cooling zone).

The supply network for the chamber 3 consists here of a single primary line 1 connected in its upstream part to a gas supply 5, to which primary line are connected four secondary lines ($1_1$, $1_2$, $1_3$, $1_4$) emerging in their downstream part in the chamber 3.

The point of connection of each secondary line to the primary line is, in each case, referenced by the letter $C_i$.

Each secondary line $1_i$ is equipped with a means for creating a pressure drop ($7_1$, $7_2$, $7_3$, $7_4$), which may, for example, consist of a calibrated restriction, of a throttling valve, or a shut-off valve which the user uses to throttle the flow coming into the line, or of a gas panel, but, more generally, this means for creating a pressure drop may also be obtained by the configuration of pipework used in each line, or by the configuration of the nozzles for injecting the atmosphere into the oven, at the downstream end of each line.

In addition, reference 6 denotes a pressure-reducing valve which appears in the upstream part of the primary line close to the gas supply 5 in order, where necessary, to reduce a first time the pressure of the gas coming from this supply 5.

It will also be noted that, in the figure, there are symbolized by the letter $A_i$ and by large black spots possible locations on the supply network for the oven at which it may be envisaged to vary, according to the invention, the pressure of the gas in order, where necessary, bearing any degradation in the content of the given component of the atmosphere in the chamber 3, for example oxygen.

By examining these various options for varying the pressure in the supply network for the chamber, in response to a variation in the content of a relevant component of the atmosphere in the chamber, it may then be imagined that it is possible, according to the invention, to control the supply of gas to the entire chamber or to part of it:

controlling the pressure at the point A1 allows effective control of the supply of gas to the entire chamber 3; and controlling the pressure at the point A2 allows control of the supply to the chamber at the last three secondary lines ($1_2$, $1_3$, $1_4$).

By examining the figure, it may therefore be seen that controlling the pressure at the point A2 makes it possible, without any difficulty, to vary the flow rate in one of the secondary lines $1_2$, $1_3$, $1_4$ without the other secondary lines being in any way affected thereby. Thus, by way of illustration, the pressure at the point A2 having been fixed, the fact of varying the flow rate in line $1_4$ (for example, during an operation of adjusting the oven by acting on the throttling valve 7 of this secondary line) will cause no variation in the other secondary lines $1_2$ and $1_3$, the pressure, as already mentioned, being fixed upstream of these lines while the pressure drop is, moreover, fixed in each of these two lines by their respective means of creating a pressure drop 7; and similar reasoning could, of course, be applied in the case of the point A3 of the plant.

FIG. 1 illustrates, well on, one particular embodiment, which is tailored to a particular network configuration, but it should be noted that if it were to be necessary to vary the pressure specifically in the case of the two hot-zone intermediate lines $1_2$ and $1_3$, a simple modification of the arrangement of the lines would be carried out for this purpose.

Figure 2:
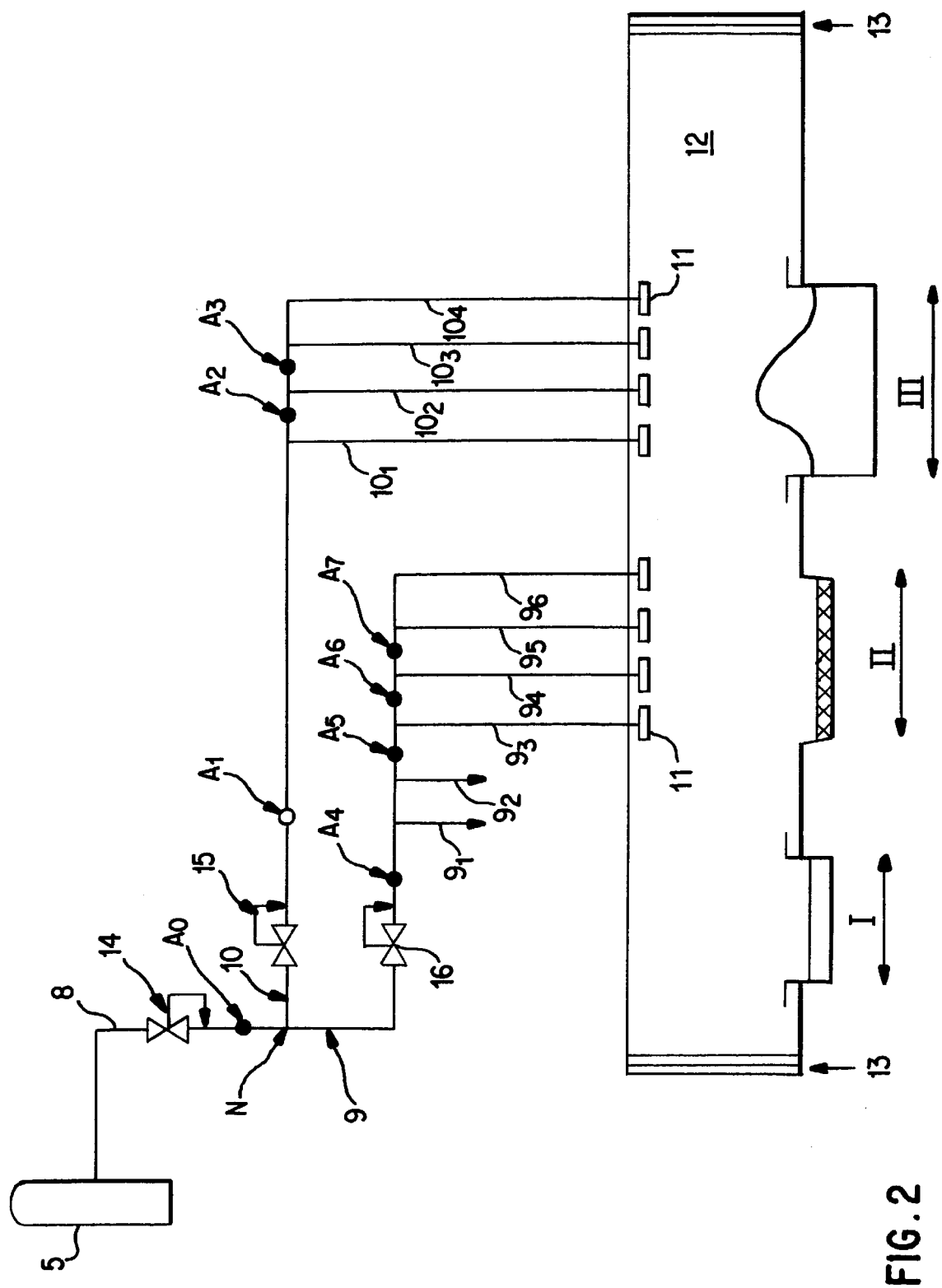
FIG. 2 is a diagrammatic representation of a plant which includes a wave-soldering machine supplied with gas via a network having two primary lines, these themselves being supplied at an upstream node via a feed pipe coming from the gas supply, four secondary lines being connected to the first primary line, while six secondary lines are connected to the second primary line of the network.

With regard to FIG. 2, this shows diagramatically the case of a wave-soldering machine 12, closed over its entire length, and therefore compatible with operation in a controlled atmosphere in each of its ones.

The reference 13 corresponds to the inlet and outlet barriers of the machine and, in addition, the symbols I, II, III respectively denote the fluxing zone, the preheat zone and the soldering (solder pot) zone of the machine.

FIG. 2 illustrates a case in which the wave-soldering machine 12 is supplied via a network consisting of two primary lines (9, 10), both coming from an upstream node N which is itself supplied with gas via a feed pipe 8 connected in its upstream part to a gas supply 5.

Connected to the primary line 10 are four secondary lines $10_1$, $10_2$, $10_3$, $10_4$ which emerge in their downstream part in the soldering zone of the machine via injection nozzles 11.

Connected to the primary line 9 are, moreover, six secondary lines $9_1$, $9_2$, $9_3$, $9_4$, $9_5$, $9_6$, four of these secondary lines emerging in their downstream part in the tunnel in the preheat zone of the machine, this again via injection nozzles 11, while two other secondary lines ($9_1$ and $9_2$) connected to this primary line 9 emerge in other zones in the machine 12, for example in the fluxing zone I or in one or other of the inlet/outlet barriers 13.

Here, too, the letters $A_i$ symbolically represent examples of location [sic] on the supply network for the machine at which, according to the invention, the pressure of the gas may be varied.

It may therefore be imagined that, for example, controlling the pressure at the point $A_0$ allows the entire gas supply for the machine to be controlled, while controlling the pressure at the point $A_1$ allows the gas supply to the soldering zone of the machine to be controlled, while controlling the pressure at the point $A_5$ allows the supply of gas to the preheat zone of the machine to be controlled.

Here, too, a specific configuration of lines has been shown. If it were necessary to vary, in a specific manner, the pressure only in the pair of lines $10_2$ and $10_3$, or $9_4$ and $9_5$, a simple modification of the arrangement of the lines would be carried out for this purpose.

It should be noted that it is extremely advantageous according to the invention to be able, where necessary, to vary the gas supply pressure in a very partial portion of the network, for example at the point $A_5$ or at the point $A_6$, making it possible, selectively, intentionally not to control or regulate the gas supply to certain zones. By way of example, in some applications it may be desired not to touch certain highly turbulent zones, the variation of which might have major consequences in terms of turbulence or of stability of the thermal profile. By way of a second example, one of the two injections $9_1$ and $9_2$ may be used as a gas for propelling the fluxor (spray type). It is then strongly recommended not to regulate the pressure in this line since such regulating would potentially result in variations in the propelling flow, and therefore in a variation in the amount of flux deposited on the circuits.

Figure 3:
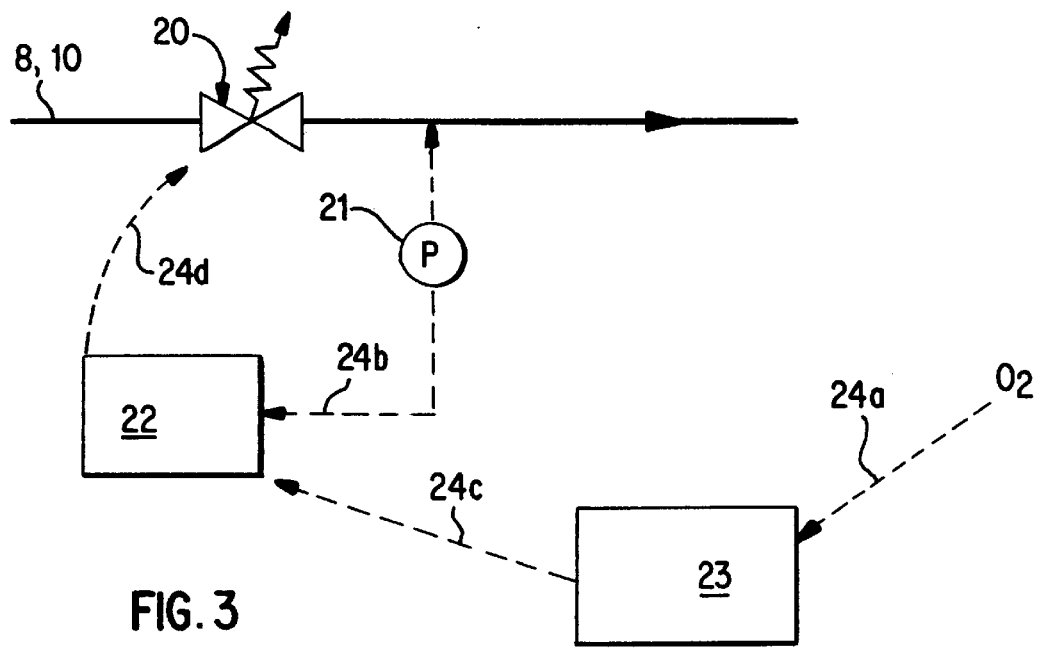
FIG. 3 is a diagrammatic representation of a system allowing pressure variation at one of the points in the network according to the invention.

FIG. 3 illustrates one of the embodiments of controlling the pressure according to the invention at a point $A_i$ in the network.

One of the lines in the network has been symbolically represented as a thick solid line, whether this be, for example, a feed pipe 8 or a primary line 10.

The line is equipped at the point in question with a solenoid valve 20 having proportional control, and with a tap for measuring the pressure downstream of this solenoid valve 20 by means of a pressure controller [sic] 21.

The operation of the system may then be described in the following manner: a data acquisition and processing unit 23 receives (24a) measurement data on the content of a given component (for example oxygen) of the atmosphere in the chamber and compares this content measurement with a control value for the content of this given component of the atmosphere in the chamber, which content control value has been communicated to it beforehand.

Depending on this comparison, the algorithm of the unit 23 is capable of generating and transmitting (24c) a new pressure control value which has to be applied to the relevant point $A_i$ in the network, which new pressure control value is transmitted to the means 22 (for example, an electronic card), which means therefore regulates the pressure at the level of the point A.

To do this, the means 22 receives (24b) the pressure measurement made by the pressure controller [sic] 21 downstream of the solenoid valve 20, compares the measurement received with the pressure control value generated by the unit 23 and acts, in a feedback mode (24d), depending on the result of this comparison, on the F amount by which the solenoid valve 20 is open, in order, where necessary, to bring the pressure downstream of the solenoid valve back to the level of the pressure control value generated.

Figure 4:
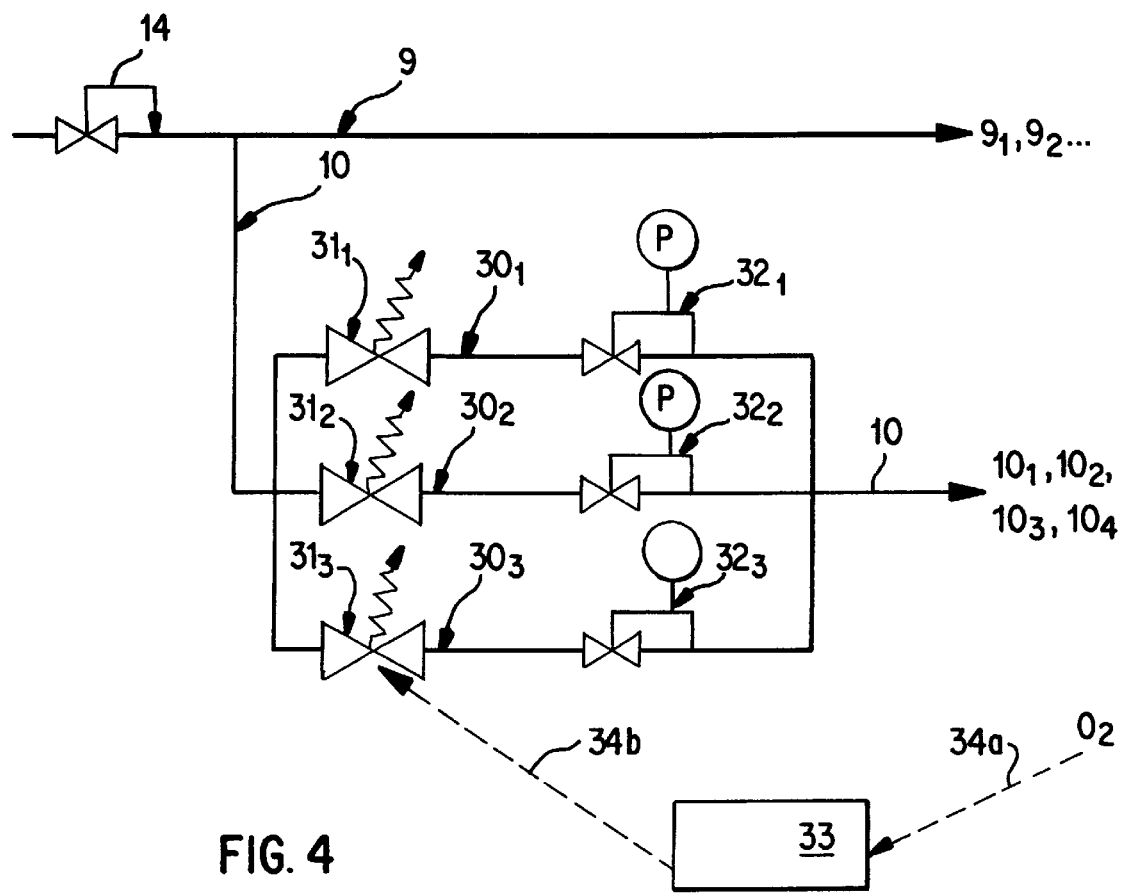
FIG. 4 is a diagrammatic representation of another system allowing pressure variation at one of the points in the network according to the invention.

FIG. 4 illustrates another embodiment of a pressure variation, for example at the point $A_1$ in the line 10 of FIG. 2, upstream of the four secondary lines $10_1$, $10_2$, $10_3$, $10_4$ (the pressure-reducing valve 15 will then be preferably omitted).

To do this, the primary line 10 has, at the point $A_1$, a structure at which it breaks out into three parallel bypass lines $30_1$, $30_2$, $30_3$ which, in their downstream part, all join up in order to be reconnected to the primary line 10.

Each bypass line is equipped with a solenoid valve (respectively $31_1$, $31_2$, $31_3$) and with a pressure-reducing valve downstream of each solenoid valve (respectively $32_1$, $32_2$, $32_3$).

As extensively described earlier within the context of the present application, a data acquisition and processing unit 33 (for example, a programmable controller) receives (34a) a datum on the content of a given component (for example oxygen) of the atmosphere in the chamber, compares the received content with a predefined content control value which had been communicated to it beforehand, and supplies a feedback signal (34b), depending on the result of this comparison, for closing the solenoid valve in use at the moment in question and for opening the solenoid valve of another of the bypass lines whose pressure level preset by the pressure-reducing valve with which it is associated corresponds to the flow of gas which has to reach the chamber via the primary line 10 in reaction to the observed change in the content of the relevant component of the atmosphere in the chamber.

A plant "close" to that described in the context of FIG. 1 was used to construct a first illustrative embodiment of the invention.

The chamber 3 was a THERMATEC (French brand) oven, of the convective type, for the reflow soldering of electronic components.

In this case, the oven is supplied not via a single primary line 1 but via a network of 2 primary lines:
- a first primary line supplying a first series of 4 secondary lines, supplying, on the one hand, the inlet barrier of the oven, and on the other hand, the outlet barrier of the oven which in this case acts both as a barrier and as a cooling zone;
- a second primary line supplying a second series of 4 secondary lines emerging in the hot zone of the oven.

Each secondary line is equipped with a combination of a throttling valve and a flow meter.

A plant such as that described in the context of FIG. 3 was then used in this case to vary, where necessary, the pressure of the gas at a point in the second primary line lying upstream of the series of secondary lines which are attached to it and which all terminate in the hot zone (thus allowing only these lines to be selectively controlled).

The entire network is supplied in normal operation with 42 Nm³/h of nitrogen of cryogenic origin, making it possible to maintain a residual oxygen content in the hot zone of the oven of less than 100 ppm.

The objective arising from the user site was to lower the overall consumption of the oven to about 28 to 30 Nm³/h of nitrogen (therefore corresponding to a decrease in flow rate of approximately 30%).

A study of the application of the site (circuits treated, solder cream used, etc.) resulted in the conclusion that it was possible to increase the tolerable residual oxygen content limit in the hot zone of the oven to 3000 ppm, without adversely affecting the quality and reproducibility of the products obtained and while maintaining a wide process window which a nitrogen-based atmosphere conventionally provides in such soldering operations.

Using the system in FIG. 3 (regulator 23, electronic card 22, solenoid valve 20 and pressure gauge 21), the following conditions were then regulated:
- the first series of 4 secondary lines was not regulated. It was supplied using a flow rate of approximately 20 Nm³/h;
- only the second series of 4 secondary lines emerging in the hot zone of the oven was regulated, to a pressure allowing an average flow rate of approximately 10 Nm³/h to be achieved (for a total flow rate therefore approaching 30 Nm³/h).

It should therefore be noted that, in production, regulating the flow rate of such or such a secondary line of the hot zone (and therefore, as mentioned earlier in the introductory part of the present application, the nitrogen top-up flow rate, the zones operating in recirculation mode) could be carried out in an extremely flexible and easy manner without any of the other secondary lines of the hot zone being in any way disturbed thereby.

It should also be noted that the method and the process according to the invention make it possible, in this specific case, to control only the flow rates (top-up flow rates, the purpose of which is to regenerate the losses involved in recirculation) of gas reaching the hot zone, avoiding having to "touch" the other flow rates, in particular that for the outlet barrier which serves for cooling, the variation of which would lead to considerable modifications in the thermal profile produced.

A plant close to that described in the context of FIG. 2 was used to construct a second illustrative embodiment of the invention.

The chamber 12 was a machine for wave-soldering electronic components, of the SEHO brand (model 7250).

The machine is supplied via two primary lines 9 and 10, a first line supplying a first series of 6 secondary lines, supplying the preheat zone II of the machine, the spray fluxor of the fluxing zone I of the machine and, moreover, the zone (III) for the solder-bath pumps, and a second primary line supplying a second series of 4 secondary lines emerging in the soldering zone III, above the bath.

Each of the primary line was originally provided in its upstream part with a pressure-reducing valve (15, 16) and with a combination of a throttling valve and a flow meter.

Moreover, the model of machine used did not have barriers 13.

All the secondary lines were without means for creating a pressure drop, as shown in FIG. 2, the injection nozzles 11 at the end of the line acting as such means.

A plant such as that described in the context of FIG. 4 was then used in this case to vary, where necessary, the pressure of the gas at the point A1 in the primary line 10, thus making it possible to control, in a selective manner, only the secondary lines emerging in the soldering zone III.

In the usual, non-regulated situation, the machine operates with an overall flow rate of approximately 25 Nm³/h of nitrogen of cryogenic origin. The following phases were then put into place by means of the system in FIG. 4:
- in standby mode, an average overall flow rate of 19.7 Nm³/h, corresponding to a flow rate of 12.5 Nm³/h in the non-regulated primary line 9 and, on average, 7.2 Nm³/h in the regulated primary line 10 (average pressure of 3 bar absolute at the point A1);
- in production mode (for a residual oxygen content in the soldering zone of less than 175 ppm=$S_{prod}$), an average overall flow rate of 21 Nm³/h, corresponding to a flow rate of 12.5 Nm³/h in the non-regulated primary line and, on average, 8.5 Nm³/h in the regulated primary line 10 (average pressure of 3.6 bar absolute at the point A1); and
- in filling mode: if at any moment during the "production" phase the measurement of the oxygen content reaching the data acquisition and processing unit is greater than 175 ppm (=S1, in this case, therefore, equal to $S_{prod}$), the unit switches the system to the "filling" bypass line and waits until the measured content comes back below a second predetermined threshold (S2), equal to 100 ppm.

The "filling" supply conditions are then as follows: an average overall flow rate of 25 Nm³/h, corresponding to a flow rate of 12.5 Nm³/h in the non-regulated primary line and, on average, a flow rate of 12.5 Nm³/h in the regulated primary line 10 (average pressure of 6.3 bar absolute at the point A1).

Installing the supply process according to the invention has allowed the user site to bring, on average, the overall flow rate down to only 20 Nm³/h.

It should therefore be noted that, in production, regulating the flow rate in such or such a secondary line for the soldering zone III could be carried out in an extremely flexible and easy manner without any of the other secondary lines of this zone being in any way disturbed thereby.

It should also be noted that the method and the process according to the invention make it possible, in this specific case, to control only the flow rates of gas reaching the soldering zone, avoiding having to "touch" the other flow rates, in particular that for the fluxer, the variation of which would lead to considerable modifications in the fluxing quality produced.

Although the present invention has been described in relation to particular embodiments, it is in no way limited thereby but is, on the contrary, capable of modifications and of alternative forms which will be apparent to those skilled in the art.

Thus, though it has more particularly been illustrated by means of two pressure-variation embodiments described in the context of FIGS. 3 and 4, it will be understood that it is not outside the scope of the present invention to use other modes of varying the pressure at a point in the network, in response to a variation in the measured content of the relevant component in the atmosphere in the chamber, whether these other modes of variation be more sophisticated than the modes illustrated or less sophisticated than them.

Thus, by way of illustration of the many possible embodiments of the invention, it is possible to use, instead of the solenoid valve extensively described above, a commercially available device called a "Current/Pressure Converter" whose use, as will be readily understood, is then as follows: on receiving the content of the given component and depending on the result of the comparison made with the predetermined control value, the unit sends, where necessary, the converter a signal representative of the new pressure to be established.

Likewise, although the above has dealt most particularly with the case of heat-treatment ovens or other soldering ovens or machines, it may be imagined that all the advantages provided by the invention, because of regulating the content by acting on a pressure, may apply very much more generally to other types of plant using an atmosphere whose quality it is desired to control.

What is claimed is:

1. Method of regulating the content of a given component of an atmosphere in a chamber, said chamber being supplied by a supply network which comprises at least one primary line connected at an upstream to receive gas from a gas supply, and at least two respective secondary lines connected at an upstream part thereof to said at least one primary line and in a downstream part thereof to said chamber, comprising implementation of the following steps:

a) measuring the content of the given component of the atmosphere in the chamber at least at one point in said chamber;

b) comparing the measured content with at least one predetermined control value for the content of said component of the atmosphere in the chamber at said point; and c) if necessary, varying the pressure of the gas at least at one point in said primary or secondary lines or in a feed pipe upstream of the at least one primary line, depending on the result of the comparison in step b).

2. The method of regulating according to claim 1, wherein the gas pressure at one of the following points in said network is varied:

i) on the at least one primary line, upstream of the point of connection between the most upstream of the respective secondary lines and the corresponding primary line;

j) on the at least one primary line, between the points connecting two of the respective secondary lines to the corresponding primary line;

k) on a feed pipe, upstream of the at least one primary line.

3. The method of regulating according to claim 1, wherein varying the pressure of the gas in step c) at said at least one point in the network further comprises:

c1) disposing a solenoid valve with proportional control at said point in the network;

c2) measuring the pressure of said gas near the point in the network, downstream of the solenoid valve;

c3) transmitting said measurement of the content of the given component, obtained during step a), to a data acquisition and processing unit capable, depending on said content and on the comparison made during step b), of generating a pressure control value Cp; and c4) transmitting said pressure control value Cp to a means capable of comparing said pressure measurement with said control value Cp and modifying the amount by which the solenoid valve is opened, where necessary, to bring said pressure back to the level of control value Cp.

4. The method of regulating according to claim 1, wherein the given component, the content of which atmosphere in the chamber is measured in step a), is oxygen.

5. The method of regulating according to claim 1, wherein varying the pressure of the gas in step c) comprises:

c1) subdividing said at least one primary line or a feed pipe of the network at said point in the network into at least three bypass lines, each equipped with a solenoid valve and with a pressure-reducing valve disposed downstream of said solenoid valve, the downstream end of each of the bypass lines being connected again to the at least one primary line or the feed pipe;

c2) presetting each of the at least three pressure-reducing valves to result in a predetermined pressure level; and c3) transmitting said measurement of the content of the given component obtained during step a) to a data acquisition and processing unit capable, depending on said content and on the comparison made during step b), of selectively opening one of said solenoid valves to allow passage of the gas only into the bypass line whose solenoid valve has thus been opened.

6. The method of regulating according to claim 5, wherein the given component, the content of which atmosphere in the chamber is measured in step a), is oxygen.

7. The method of regulating according to claim 5, wherein said predetermined pressure levels in each of the at least three bypass lines correspond, respectively:

in a first bypass line, to a first pressure level $P_s$ preset by the pressure-reducing valve, corresponding to a gas flow rate downstream of the pressure-reducing valve, defined as a standby flow rate $Q_s$;

in a second bypass line, to a second pressure level $P_{prod}$ preset by the pressure-reducing valve, corresponding to a gas flow rate downstream of the pressure-reducing valve, defined as a production flow rate $Q_{prod}$; and in a third bypass line, to a third pressure level $P_{fill}$ preset by the pressure-reducing valve, corresponding to a gas flow rate downstream of the pressure-reducing valve, defined as a filling rate $Q_{fill}$; the relationship of the three flow rates being as follows:

$$Q_s < Q_{prod} < Q_{fill}$$

8. Process for supplying a chamber with gas, wherein said chamber is supplied by a supply network which comprises at least one primary line connected at an upstream part thereof to receive said gas from a gas supply, and at least two respective secondary lines connected at an upstream part thereof to said at least one primary line and in a downstream part thereof to said chamber, comprising implementation of the following steps:

a) measuring the content of the given component of the atmosphere in the chamber at least at one point in said chamber;

b) comparing the measured content with at least one predetermined control value for the content of said component of the atmosphere in the chamber at said point; and c) if necessary, varying the pressure of the gas at least at one point in said primary or secondary lines or in a feed upstream of the at least one primary line, depending on the result of the comparison in step b).

9. The process for supplying a chamber according to claim 8, wherein the gas pressure at one of the following points in said network is varied:

i) on the at least one primary line, upstream of the point of connection between the most upstream of the respective secondary lines and the corresponding primary line;

j) on the at least one primary line, between the points connecting two of the respective secondary lines to the corresponding primary line;

k) on a feed pipe, upstream of the at least one primary line.

10. The process for supplying a chamber according to claim 8, wherein varying the pressure of the gas in step c) at said point in the network further comprises:

c1) disposing a solenoid valve with proportional control at said point in the network;

c2) measuring the pressure of said gas near the point in the network, downstream of the solenoid valve;

c3) transmitting said measurement of the content of the given component, obtained during step a), to a data acquisition and processing unit capable, depending on said content and on the comparison made during step b), of generating a pressure control value Cp; and c4) transmitting said pressure control value Cp to a means capable of comparing said pressure measurement with said control value Cp and modifying the amount by which the solenoid valve is opened, where necessary, to bring said pressure back to the level of control value Cp.

11. The process for supplying a chamber according to claim 8, wherein varying the pressure of the gas in step c) further comprises:

c1) subdividing said at least one primary line or a feed pipe of the network at said point in the network into at least three bypass lines, each equipped with a solenoid valve and with a pressure-reducing valve disposed downstream of said solenoid valve, the downstream end of each of the bypass lines being connected again to the at least one primary line or the feed pipe;

c2) presetting each of the at least three pressure-reducing valves to result in a predetermined pressure level; and c3) transmitting said measurement of the content of the given component obtained during step a) to a data acquisition and processing unit capable, depending on said content and on the comparison made during step b), of selectively opening one of said solenoid valves to allow passage of the gas only into the bypass line whose solenoid valve has thus been opened.

12. The process for supplying a chamber according to claim 11, wherein said predetermined pressure levels in each of the at least three bypass lines correspond, respectively:

in a first bypass line, to a first pressure level $P_s$ preset by the pressure-reducing valve, corresponding to a gas flow rate downstream of the pressure-reducing valve, defined as a standby flow rate $Q_s$;

in a second bypass line, to a second pressure level $P_{prod}$ preset by the pressure-reducing valve, corresponding to a gas flow rate downstream of the pressure-reducing valve, defined as a production flow rate $Q_{prod}$; and in a third bypass line, to a third pressure level $P_{fill}$ preset by the pressure-reducing valve, corresponding to a gas flow rate downstream of the pressure-reducing valve, defined as a filling rate $Q_{fill}$; the relationship of the three flow rates being as follows:

$$Q_s < Q_{prod} < Q_{fill}$$

13. The process for supplying a chamber according to claim 11, wherein said chamber to which gas is supplied is a heat-treatment oven, a soldering oven or an oven or machine for the soldering/tinning of electronic components.

14. The process for supplying a chamber according to claim 13, further comprising:

during a first phase, starting up the oven or machine, the data acquisition and processing unit having opened the solenoid valve of the bypass line whose pressure-reducing valve has been preset to a pressure pressure level corresponding to a filling flow rate $Q_{fill}$ supplies gas to the chamber;

the filling phase is maintained for a predefined time $t_{fill}$;

after the filling time $t_{fill}$, said data acquisition and processing unit closes the solenoid valve of the bypass line whose preset pressure level corresponds to a filling flow rate $Q_{fill}$ in order to open the solenoid valve of the bypass line whose preset pressure level correspond to a standby flow rate $Q_s$;

when a component to be treated in the chamber is detected at the entrance of the chamber, said data acquisition and processing unit closes the solenoid valve of the bypass line whose pressure level corresponds to the standby flow rate $Q_s$ in order to switch to a production phase by opening the solenoid valve of the bypass line whose preset pressure level corresponds to a production flow rate $Q_{prod}$; and if after a predetermined time $t_{prod}$ a new piece to be treated has not been detected at the entrance of the chamber, said data acquisition and processing unit closes the solenoid valve of the bypass line whose preset pressure level corresponds to a production flow rate $Q_{prod}$ in order to switch back to the standby phase by opening the solenoid valve of the bypass line whose preset pressure level corresponds to the standby flow rate $Q_s$.

15. The process for supplying a chamber according to claim 13, wherein at least two of the secondary lines of said network emerge in a hot zone of the oven or of the machine and said step c) varying the pressure at said point in the network which supplies only the at least two secondary lines of the network emerging in the hot zone is carried out.

16. The process for supplying a chamber according to claim 8, wherein said gas is supplied to a heat-treatment oven or to a soldering oven or to an oven or machine for the soldering/tinning of electronic components.

17. The process for supplying a chamber according to claim 16, wherein at least two of the secondary lines of said network emerge in a hot zone of the oven or of the machine and said step c) varying the pressure at said point in the network which supplies only the at least two secondary lines of the network emerging in the hot zone is carried out.

18. Plant for supplying a chamber with gas, comprising:

a gas supply;

a network for supplying the chamber with said gas, including at least one primary line connected at an upstream end to receive gas from a gas supply, and at least two secondary lines connected in their upstream part to said primary line and in their downstream end to said chamber;

means for measuring a content of a given component of an atmosphere at least at one point in said chamber;

means for comparing the measured content with at least one predetermined control value for the content of said component of the atmosphere in the chamber at said point; and means for varying said pressure of the gas at one of the points in said primary or secondary lines or in a feed pipe upstream of the at least one primary line, depending on the result of said comparison of the contents.

19. Plant for supplying a chamber with gas according to claim 18, wherein said point on the network where the pressure is varied is one of the following points:

i) on the at least one primary line, upstream of the point of connection between the most upstream of the respective secondary lines and the corresponding primary line;

j) on the at least one primary line, between the points connecting two of the respective secondary lines to the corresponding primary line;

k) on a feed pipe, upstream of the at least one primary line.

20. Plant for supplying a chamber with gas according to claim 18, further comprising:

c1) a solenoid valve with proportional control disposed at said point in the network;

c2) means for measuring the gas pressure near said point in the network, downstream of said solenoid valve;

c3) a data acquisition and processing unit for generating a pressure control value Cp, depending on said measured content and on said comparison of contents;

c4) a means for comparing said pressure measurement with said control value Cp to modify the amount by which the solenoid is opened to bring said pressure back to the control value Cp, as necessary.

21. Plant for supplying a chamber with gas according to claim 18, wherein:

said primary line or a feed pipe on the network is subdivided at said point in the network into at least three bypass lines, each equipped with a solenoid valve and with a pressure-reducing valve disposed downstream of said solenoid valve, the downstream end of each of the bypass lines being connected again to the primary line or the feed pipe;

a data acquisition and processing unit selectively, opening and closing one of said solenoid valves to allow passage of the gas into the bypass line whose solenoid valve has thus been opened, based on said measured value and on said comparison of contents.

22. Plant for supplying a chamber with gas according to claim 18, wherein all or part of the secondary lines are provided with means for creating a pressure drop.

23. Plant for supplying a chamber with gas according to claim 22, wherein said means for creating a pressure drop comprises:

a calibrated restriction;

a throttling valve;

a shut-off valve;

a gas panel;

a configuration of pipework utilized in a line;

a configuration of a nozzle for injecting gas into said oven, lying on the downstream end of a relevant line.

* * * * *